United States Patent
Li et al.

(10) Patent No.: US 12,459,797 B2
(45) Date of Patent: Nov. 4, 2025

(54) FORK COLLISION PROCESSING METHOD AND APPARATUS, ROBOT, DEVICE, MEDIUM, AND PRODUCT

(71) Applicant: HAI ROBOTICS CO., LTD., Guangdong (CN)

(72) Inventors: Huixiang Li, Guangdong (CN); Jui-chun Cheng, Guangdong (CN); Jiawei He, Guangdong (CN)

(73) Assignee: HAI ROBOTICS CO., LTD., Guangdong (CN)

( * ) Notice: Subject to any disclaimer, the term of this patent is extended or adjusted under 35 U.S.C. 154(b) by 272 days.

(21) Appl. No.: 18/343,992

(22) Filed: Jun. 29, 2023

(65) Prior Publication Data
US 2023/0348249 A1 Nov. 2, 2023

Related U.S. Application Data

(63) Continuation of application No. PCT/CN2021/137726, filed on Dec. 14, 2021.

(30) Foreign Application Priority Data

Dec. 31, 2020 (CN) .......................... 202011637451.8

(51) Int. Cl.
*B66F 9/075* (2006.01)
*B66F 9/06* (2006.01)
*G05D 1/00* (2024.01)

(52) U.S. Cl.
CPC ............ *B66F 9/0755* (2013.01); *B66F 9/063* (2013.01); *G05D 1/0055* (2013.01); *G05D 1/0223* (2013.01); *G05D 1/0238* (2013.01)

(58) Field of Classification Search
CPC ............................ G05D 1/0227; B66F 9/0755
(Continued)

(56) References Cited

U.S. PATENT DOCUMENTS

2014/0133944 A1    5/2014    Pangrazio et al.

FOREIGN PATENT DOCUMENTS

| CN | 102099226 A | 6/2011 |
| CN | 108147325 A | 6/2018 |

(Continued)

OTHER PUBLICATIONS

Machine Translation CN108706520 Oct. 26, 2018 (Year: 2018).*
(Continued)

*Primary Examiner* — Navid Z. Mehdizadeh
*Assistant Examiner* — Vincent Feng
(74) *Attorney, Agent, or Firm* — Frank Gao, Esq.

(57) ABSTRACT

This application provides a fork collision processing method and apparatus, a robot, a device, a medium, and a product. The method includes: determining a collision type when it is detected that a fork of a robot encounters a collision; determining a fork collision processing strategy according to the collision type; and processing the fork collision according to the fork collision processing strategy. In this application, when it is detected that the fork of the robot encounters a collision, the collision type of the fork collision is first determined, then the fork collision processing strategy is determined according to the determined collision type, and finally the fork collision event is processed according to the determined fork collision processing strategy.

18 Claims, 6 Drawing Sheets

(58) Field of Classification Search
USPC .......................................................... 701/50
See application file for complete search history.

(56) References Cited

FOREIGN PATENT DOCUMENTS

| | | | |
|---|---|---|---|
| CN | 108237997 A | 7/2018 | |
| CN | 108706520 A | * 10/2018 | ............. B60Q 9/008 |
| CN | 109160451 A | 1/2019 | |
| CN | 209522152 U | 10/2019 | |
| CN | 110693396 A | 1/2020 | |
| CN | 110712205 A | 1/2020 | |
| CN | 209922808 U | 1/2020 | |
| CN | 110844843 A | 2/2020 | |
| CN | 111037564 A | 4/2020 | |
| CN | 108237997 B | 8/2020 | |
| CN | 111645070 A | 9/2020 | |
| CN | 211712539 U | 10/2020 | |
| DE | 4234375 A1 | 4/1994 | |
| TW | 201941887 A | 11/2019 | |
| TW | 202015869 A | 5/2020 | |

OTHER PUBLICATIONS

Cited in the search/examination report of EP21913881.5.
First Office Action of CN202011637451.8.
Notice of Allowance of CN202011637451.8.
International Search Report for PCT/CN2021/137726.

* cited by examiner

FORK COLLISION PROCESSING METHOD AND APPARATUS, ROBOT, DEVICE, MEDIUM, AND PRODUCT

CROSS-REFERENCE TO RELATED APPLICATIONS

This application is a continuation of International Patent Application No. PCT/CN2021/137726, filed on Dec. 14, 2021, which claims priority to Chinese Patent Application No. 202011637451.8 filed with the China National Intellectual Property Administration on Dec. 31, 2020 and entitled "FORK COLLISION PROCESSING METHOD AND APPARATUS, ROBOT, DEVICE, MEDIUM, AND PRODUCT", which are incorporated herein by references in their entireties.

TECHNICAL FIELD

This application relates to the field of intelligent warehousing technologies, and in particular, to a fork collision processing method and apparatus, robot, a device, a medium, and a product.

BACKGROUND

As intelligent storage technologies develop, robots are usually used in warehouses to carry and store goods. Goods processing through robots is more efficient than manual goods processing.

In the prior art, a robot for carrying goods is usually equipped with a fork for taking goods. The robot may control the fork to perform actions such as stretch and retraction and rotation etc., so that the fork can take out goods in different directions or place goods at different positions on a shelving unit.

However, when obstacles exist around the robot, the fork is likely to collide with the obstacles. In this case, if the robot continues to control the fork to perform actions, the fork is likely to be damaged, which increases the device maintenance costs.

SUMMARY

This application provides a fork collision processing method and apparatus, a robot, a device, a medium, and a product, so that a fork can be effectively protected from being damaged, thereby reducing the device maintenance costs.

In a first aspect, this application provides a fork collision processing method, including:
  determining a collision type when it is detected that a fork of a robot encounters a collision;
  determining a fork collision processing strategy according to the collision type; and
  processing the fork collision according to the fork collision processing strategy.

In some embodiments, the collision type includes a collision with a telescopic arm stretched and a collision with the telescopic arm not stretched.

In some embodiments, when the collision type is the collision with the telescopic arm not stretched, the determining a fork collision processing strategy according to the collision type includes:
  determining a first collision processing strategy according to the collision type; or
  determining a second collision processing strategy according to the collision type, where
  the first collision processing strategy includes: controlling a movement speed of the fork to be zero; and
  the second collision processing strategy includes: controlling the movement speed of the fork to be zero, and controlling a first driving element configured to drive the fork to rotate to stop driving the fork to rotate, so that the fork is in a free rotating state.

In some embodiments, the first collision processing strategy is determined according to the collision type when the fork is loaded with goods; and
  the second collision processing strategy is determined according to the collision type when the fork is not loaded with goods.

In some embodiments, when the collision type is the collision with the telescopic arm stretched, the determining a fork collision processing strategy according to the collision type includes:
  determining a third collision processing strategy according to the collision type; or
  determining a fourth collision processing strategy according to the collision type; or
  determining a fifth collision processing strategy according to the collision type; or
  determining a sixth collision processing strategy according to the collision type, where
  the third collision processing strategy includes: controlling a stretch/retraction speed of the telescopic arm to be zero;
  the fourth collision processing strategy includes: controlling the stretch/retraction speed of the telescopic arm to be zero, and controlling a first driving element configured to drive the fork to rotate to stop driving the fork to rotate, so that the fork is in a free rotating state;
  the fifth collision processing strategy includes: controlling the stretch/retraction speed of the telescopic arm to be zero, and controlling a second driving element configured to drive the telescopic arm to stretch/retract to stop driving the telescopic arm to stretch/retract, so that the telescopic arm is in a free stretching/retracting state; and
  the sixth collision processing strategy includes: controlling the stretch/retraction speed of the telescopic arm to be zero, and controlling the first driving element configured to drive the fork to rotate to stop driving the fork to rotate, so that the fork is in the free rotating state; and controlling the second driving element configured to drive the telescopic arm to stretch/retract to stop driving the telescopic arm to stretch/retract, so that the telescopic arm is in the free stretching/retracting state.

In some embodiments, the third collision processing strategy is determined according to the collision type when the fork is loaded with goods; and
  the fourth collision processing strategy, the fifth collision processing strategy, or the sixth collision processing strategy is determined according to the collision type when the fork is not loaded with goods.

In some embodiments, it is determined in at least one of the following ways that the fork of the robot encounters a collision:
  an increase margin of an operating current of a driving element reaches a first preset threshold, and a duration for which a situation that the increase margin of the operating current of the driving element reaches the first preset threshold lasts reaches a first preset duration; or a decrease margin of the movement speed of the fork reaches a second preset threshold; or the increase margin of the operating current of the driving element reaches a third preset threshold, a duration for which a situation that the increase margin of the operating current of the driving element reaches the third preset threshold lasts reaches a second preset duration, and the decrease margin of the movement speed of the fork reaches a fourth preset threshold; or a change margin of a pressure detected by a pressure sensor arranged on the fork reaches a fifth preset threshold, where the driving element includes at least one of the first driving element configured to drive the fork to rotate, the second driving element configured to drive the telescopic arm to stretch/retract, and a third driving element configured to drive the fork to ascend/descend.

In some embodiments, the method further includes:

identifying an obstacle in collision and processing the obstacle according to an identification result after it is detected that the fork of the robot encounters a collision.

In some embodiments, the processing the obstacle according to an identification result includes:

determining a goods type of the obstacle according to the identification result when the obstacle is goods; and carrying the obstacle to a corresponding goods storage position according to the goods type of the obstacle.

In some embodiments, the method further includes:

executing a fork collision avoidance strategy when it is detected that the fork is about to encounter a collision.

In some embodiments, it is determined in the following way that the fork of the robot is about to encounter a collision:

it is determined that the obstacle is on a movement path of the fork based on a distance between the fork and the obstacle and a current movement state of the fork.

In some embodiments, the executing a fork collision avoidance strategy includes: adjusting a position of the fork according to a position of the obstacle so that the fork does not collide with the obstacle.

In some embodiments, the adjusting a position of the fork according to a position of the obstacle so that the fork does not collide with the obstacle includes:

adjusting a movement path of the fork when the obstacle is located on the movement path of the fork, so that the obstacle is not located on the movement path of the fork; or controlling the fork to move along the movement path to a preset position and outputting obstacle prompt information when the obstacle is located on the movement path of the fork, where the preset position is a position on the movement path at a preset distance to the obstacle.

In a second aspect, this application provides a fork collision processing apparatus, including:

a type determination module, configured to determine a collision type when it is detected that a fork of a robot encounters a collision;

a strategy determination module, configured to determine a fork collision processing strategy according to the collision type; and a collision processing module, configured to process the fork collision according to the fork collision processing strategy.

In a third aspect, this application provides a robot, including a fork and the fork collision processing apparatus described above.

In a fourth aspect, this application further provides a server, including a memory, a processor, and a computer program stored in the memory and executable in the processor, where when the processor executes the program, the above fork collision processing method is implemented.

In a fifth aspect, this application provides a computer-readable storage medium storing computer-executable instructions that, when executed by a processor, implement the above fork collision processing method.

In a sixth aspect, this application provides a computer program product, including a computer program that, when executed by a processor, implements the above fork collision processing method.

According to the fork collision processing method and apparatus, the robot, the device, the medium, and the product provided in this application, the method includes: determining the collision type when it is detected that the fork of the robot encounters a collision; determining the fork collision processing strategy according to the collision type; and processing the fork collision according to the fork collision processing strategy. In this application, when it is detected that the fork of the robot encounters a collision, the collision type of the fork collision is first determined, then the fork collision processing strategy is determined according to the determined collision type, and finally the fork collision event is processed according to the determined fork collision processing strategy. Compared with the practice that the robot continues to control the fork to perform actions, in this application, the fork collision event may be processed according to the collision type of the fork collision, so that the fork can be effectively protected from being damaged, thereby reducing the device maintenance costs.

BRIEF DESCRIPTION OF THE DRAWINGS

The drawings herein, which are incorporated into the description and constitute a part of the description, illustrate embodiments that conform to the present disclosure and are used together with the description to explain the principles of the present disclosure.

Figure 1:
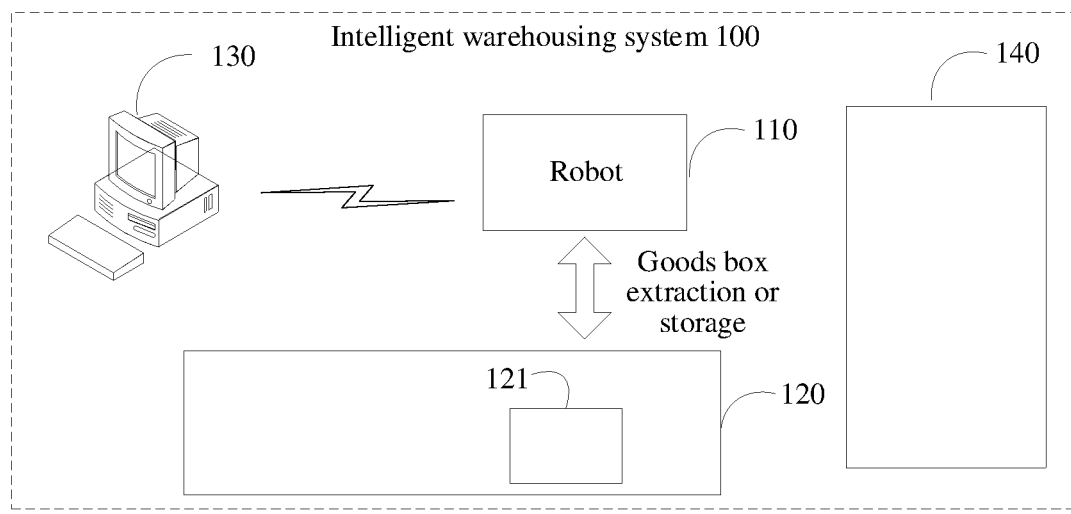
FIG. 1 is an application scenario diagram of a fork collision processing method according to an embodiment of this application.

Specific embodiments of the present disclosure are shown through the above drawings, and more detailed description is provided below. These drawings and text description are not for limiting the scope of the concept of the present disclosure in any way, but for illustrating the concept of the present disclosure for those skilled in the art by referring to specific embodiments.

DETAILED DESCRIPTION

Exemplary embodiments are described in detail herein, and examples of the exemplary embodiments are shown in the drawings. When the following description involves the drawings, unless otherwise indicated, the same numerals in different drawings represent the same or similar elements. The implementations described in the following exemplary embodiments do not represent all implementations consistent with this application. On the contrary, they are merely examples of apparatuses and methods consistent with some aspects of this application as detailed in the appended claims.

An application scenario in an embodiment of this application is described below.

FIG. 1 is an application scenario diagram of a fork collision processing method according to an embodiment of this application. As shown in FIG. 1, the fork collision processing method provided in this embodiment of this application may be executed by robots, electronic devices such as computers or servers, warehouse management devices, or other devices in a warehousing system. In an intelligent warehousing system 100, a robot 110 is used to extract goods from and/or store goods on a shelving unit 120, and a warehouse management device 130 is used to perform path planning, status monitoring, dispatching, and the like for the robot 110, to cause the robot 110 to move to a set position to extract or store goods. The warehouse management device 130 further stores storage information of each storage position of the shelving unit 120 and basic information of goods for warehouse management. When an order task exists in the warehousing system 100, the robot 110 carries one or more goods 121 on the shelving unit 120 corresponding to the order task to a conveying workstation area 140 to complete the order task.

Figure 2A:
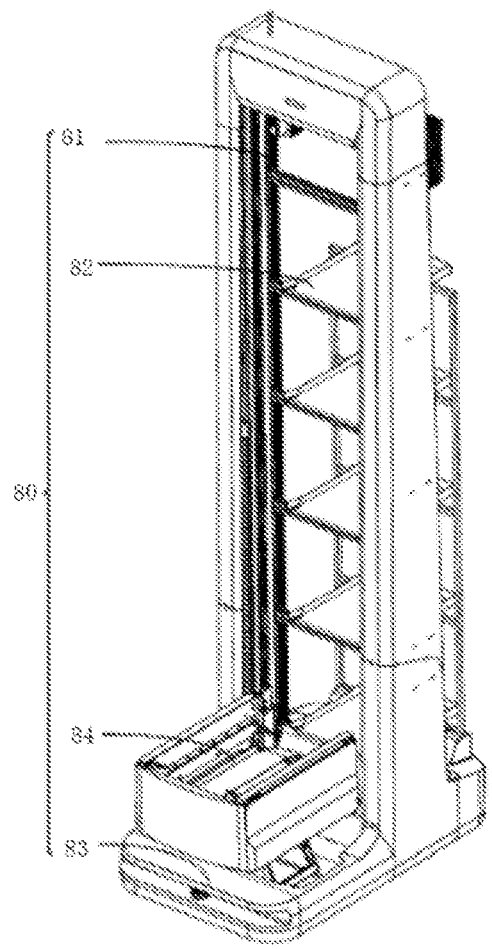
FIG. 2A is a schematic structural diagram of a robot according to an embodiment of this application.

FIG. 2A is a schematic structural diagram of a robot according to an embodiment of this application. As shown in FIG. 2A, a robot 80 includes a mobile chassis 83, a storage rack 82, a fork 84, and a lifting assembly 81. The storage rack 82, the fork 84, and the lifting assembly 81 are all mounted to the mobile chassis 83, and a plurality of storage units are arranged on the storage rack 82. The lifting assembly 81 includes a third driving element. The third driving element may be configured to drive the fork 84 to ascend/descend, to align the fork 84 to any storage unit on the storage rack 82 or to the shelving unit and/or goods. The fork 84 is rotatable about an axis which is a vertical direction, to adjust an orientation, so as to be aligned to the storage unit or to the shelving unit and/or goods. The fork 84 is configured to load or unload goods, so as to carry the goods between the shelving unit and the storage unit.

Exemplarily, the storage rack 82 may be selectively arranged or not arranged. When the storage rack 82 is not arranged, the robot 80 stores goods in an accommodating space of the fork 84 during carrying of the goods.

The robot 80 in the above embodiment may perform steps about fork collision processing in the fork collision processing method provided in any embodiment of this application, to protect the fork of the robot from being damaged.

In a process in which the robot 80 performs a goods storage task, the robot 80 moves to a position in a storage space designated for goods, and moves a target object from the storage unit of the robot body to the shelving unit through an adjustment assembly such as a rotary mechanism in collaboration with the fork 84.

Figure 2B:
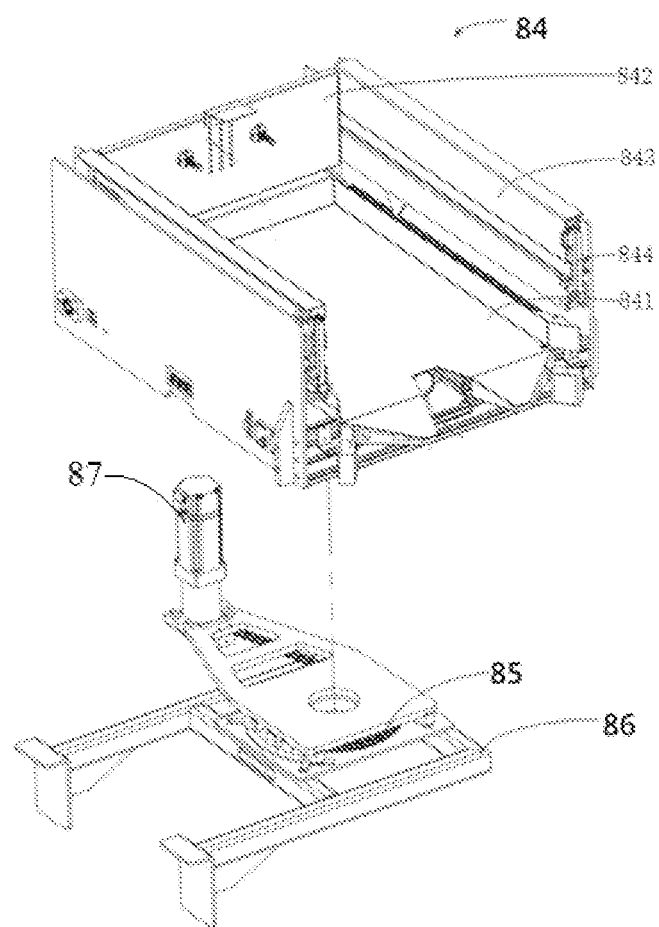
FIG. 2B is a schematic structural diagram of a fork in the embodiment shown in FIG. 2A of this application.

Exemplarily, FIG. 2B is a schematic structural diagram of a fork in the embodiment shown in FIG. 2A of this application.

Exemplarily, the fork 84 is mounted to a bracket 86 through a rotary mechanism 85, and a first driving element 87 is connected to the rotary mechanism 85. The first driving element 87 is configured to drive the rotary mechanism 85, so as to drive the fork 84 to rotate about a vertical axis relative to the bracket 86 align to the storage unit or to the shelving unit and/or the goods. The fork 84 is configured to carrying the goods between the storage unit and the shelving unit. If the fork 84 is not aligned to the shelving unit and/or the goods, the rotary mechanism 85 may be driven through the first driving element 87 to drive the fork 84 to rotate relative to the bracket 86, to ensure that the fork 84 is aligned to the shelving unit and/or the goods.

Figure 2C:
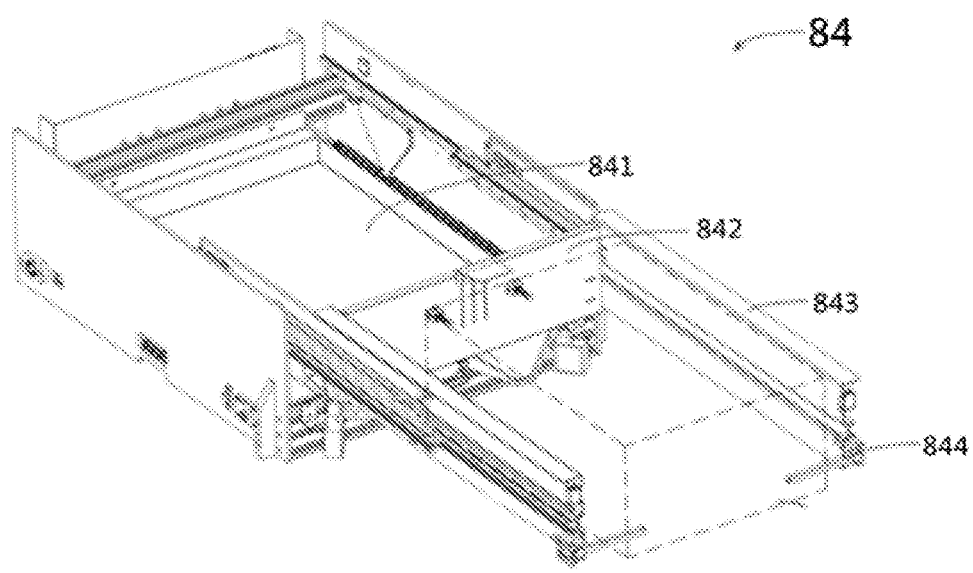
FIG. 2C is a schematic structural diagram of the fork in the embodiment shown in FIG. 2A of this application.

Exemplarily, FIG. 2C is a schematic structural diagram of the fork in the embodiment shown in FIG. 2A of this application. To facilitate understanding, refer also to FIG. 2B. As shown in FIG. 2C, the fork 84 includes a tray 841 and a telescopic arm assembly. The tray 841 is configured to place goods, which may be a flat plate that is horizontally arranged. The telescopic arm assembly is configured to push goods placed on the tray 841 out of the tray 841 or pull goods to the tray 841. The telescopic arm assembly includes a telescopic arm 843, a fixed push rod 842, and a movable push rod 844. The telescopic arm 843 includes a left telescopic arm and a right telescopic arm. The telescopic arm 843 may stretch horizontally. In a direction perpendicular to the stretching direction of the telescopic arm 843 and parallel to the tray 841, the telescopic arm 843 is located on a side of the tray 841. The telescopic arm 843 is powered by a second driving element. The power is transmitted by a chain wheel mechanism. Depending on an actual situation, the chain wheel mechanism may be replaced with a transmission mechanism such as a belt pulley mechanism or a screw mechanism for driving. The fixed push rod 842 and the movable push rod 844 are both mounted to the telescopic arm 843, and the fixed push rod 842 and the movable push rod 844 may stretch with the telescopic arm 843. The fixed push rod 842 and the tray 841 are located on the same side of the telescopic arm 843. When the telescopic arm 843 stretches, the fixed push rod 842 is configured to push goods out of the tray 841. The movable push rod 844 may be received in the telescopic arm 843. When the movable push rod 844 is not received in the telescopic arm 843, the movable push rod 844, the fixed push rod 842, and the tray 841 are located on the same side of the telescopic arm 843, and the movable push rod 844 is located in a stretching direction of the fixed push rod 842 along the telescopic arm 843. The movable push rod 844 may be directly driven by an electric motor. Depending on an actual situation, the power may alternatively be transmitted by using a transmission mechanism such as a gear set or a link mechanism. When the movable push rod 844 is not received in the telescopic arm and the telescopic arm 843 retracts, the movable push rod 844 is configured to pull goods to the tray 841.

Exemplarily, the fixed push rod 842 of the fork 84 may be designed as a finger structure similar to the movable push rod 844.

Exemplarily, the fork 84 may be designed as a structure in which a spacing width of the telescopic arm assembly is adjustable. During storage/taking of goods, the spacing width of the telescopic arm assembly may be adjusted according to a size of the goods.

Figure 2D:
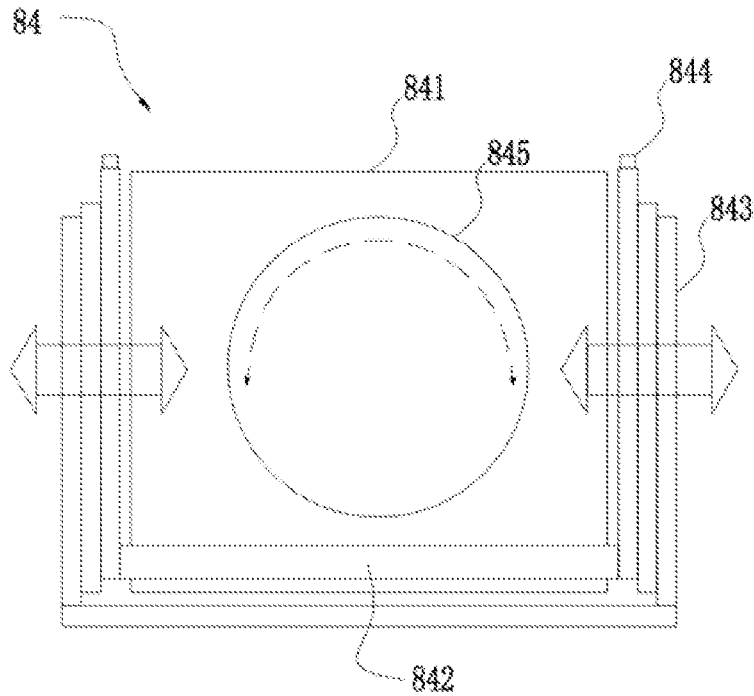
FIG. 2D is a schematic structural diagram of another fork in the embodiment shown in FIG. 2A of this application.

Exemplarily, the fork 84 may further include a steering structure, such as a turntable. The steering structure may be configured to change an orientation of the goods placed on the tray 841. FIG. 2D is a schematic structural diagram of another fork in the embodiment shown in FIG. 2A of this application. It may be learned from FIG. 2D and FIG. 2C that, the fork 84 may further include a steering structure, that is, a rotary table 845 in FIG. 2D, to change the orientation of the goods placed on the tray 841.

In the prior art, the robot may control the fork to rotate through the first driving element, control the telescopic arm of the fork to stretch/retract through the second driving element, and control the fork to ascend/descend through the third driving element. The first driving element, the second driving element, and the third driving element may specifically be electric motors, motors (such as hydraulic motors), cylinders, or the like. However, during the above movement, when obstacles exist around the robot, the fork is likely to collide with the obstacles. After the collision, if the robot continues to control the fork to rotate, stretch/retract, or ascend/descend, the fork is likely to be damaged, which increases the device maintenance costs.

Based on the above, a main concept of this application is as follows: The robot may perform collision detection on the fork. When it is detected that the fork encounters a collision, the robot may determine a collision type of the fork collision depending on whether the telescopic arm is in a stretched state, then determine a fork collision processing strategy according to the determined collision type, and finally process the fork collision event according to the determined fork collision processing strategy. Compared with the practice that the robot continues to control the fork to rotate, stretch/retract, or ascend/descend, in this application, the fork collision event may be processed according to the collision type of the fork collision, so that the fork is effectively protected from being damaged, thereby reducing the device maintenance costs.

The technical solutions of this application and how the technical solutions of this application resolve the above technical problems are described in detail below through specific embodiments. The following specific embodiments may be combined with each other, and the same or similar concepts or processes may not be repeated in some embodiments. The embodiments of this application are described below with reference to the drawings.

It may be understood that the processing steps of the fork collision processing method in this application may be implemented by a terminal, an electronic device (such as a computer or a server), or the warehouse management device shown in FIG. 1. The terminal may be a control terminal arranged inside the robot for controlling the robot.

Figure 3:
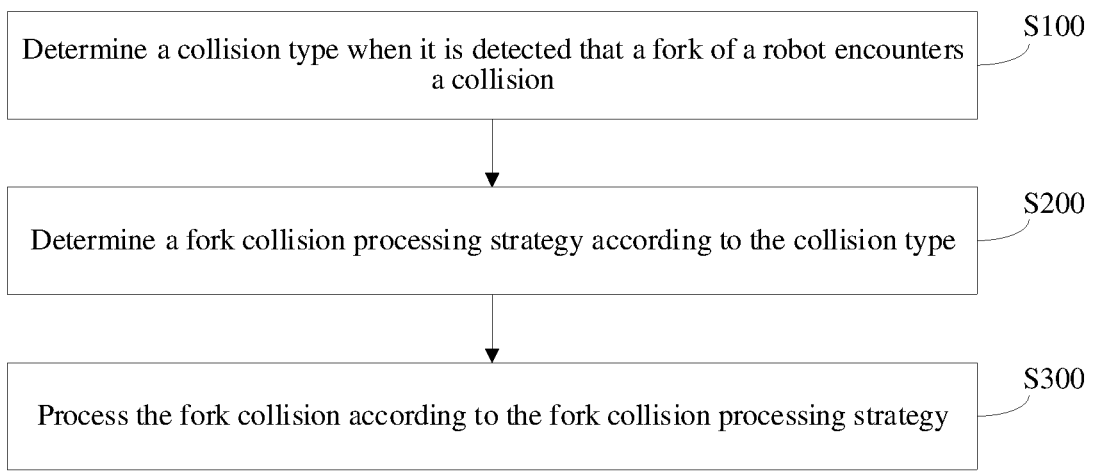
FIG. 3 is a schematic diagram of a fork collision processing method according to an embodiment of this application.

FIG. 3 is a schematic diagram of a fork collision processing method according to an embodiment of this application. For example, the fork collision processing method is applied to a control terminal of a robot. As shown in FIG. 3, the method mainly includes the following steps:

S100: Determine a collision type when it is detected that a fork of a robot encounters a collision.

When it is detected that the fork of the robot encounters a collision, the control terminal may first determine the collision type of the fork based on a current state of a structure included in the fork. The structure included in the fork may be a telescopic arm, for example. The current state of the telescopic arm includes a stretched state or a non-stretched state. The different states of the telescopic arm assembly may be used for pushing goods placed on a tray out of the tray or pulling goods to the tray.

S200: Determine a fork collision processing strategy according to the collision type.

After determining the collision type, the control terminal further determines the corresponding fork collision processing strategy according to the collision type. Specifically, different collision types correspond to different fork collision processing strategies.

S300: Process the fork collision according to the fork collision processing strategy.

After determining the fork collision processing strategy, the control terminal processes the fork collision event according to the determined fork collision processing strategy. Since different collision types correspond to different fork collision processing strategies, processing of the fork collision event varies.

In the fork collision processing method provided in this application, when it is detected that the fork of the robot encounters a collision, the collision type of the fork collision is first determined, then the fork collision processing strategy is determined according to the determined collision type, and finally the fork collision event is processed according to the determined fork collision processing strategy. Compared with the practice that the robot continues to control the fork to perform actions, in this application, the fork collision event may be processed according to the collision type of the fork collision, so that the fork can be effectively protected from being damaged, thereby reducing the device maintenance costs.

In some embodiments, the collision type includes a collision with a telescopic arm stretched and a collision with the telescopic arm not stretched.

Specifically, when it is detected that the fork encounters a collision, the control terminal determines that the collision type is the collision with the telescopic arm stretched if the telescopic arm is in the stretched state, and determines that the collision type is the collision with the telescopic arm not stretched if the telescopic arm is in the non-stretched state. Therefore, by determining the collision type according to the operating state of the telescopic arm, the fork collision processing strategy can be determined, to protect the fork.

In some embodiments, when the collision type is the collision with the telescopic arm not stretched, the determination of the fork collision processing strategy according to the collision type includes: determining a first collision processing strategy according to the collision type; or determining a second collision processing strategy according to the collision type.

The first collision processing strategy includes: controlling a movement speed of the fork to be zero.

The second collision processing strategy includes: controlling the movement speed of the fork to be zero, and controlling a first driving element configured to drive the fork to rotate to stop driving the fork to rotate, so that the fork is in a free rotating state.

When it is detected that the fork encounters a collision, the control terminal determines that the collision type is the collision with the telescopic arm not stretched if the telescopic arm is in the non-stretched state. In this case, the control terminal may determine the fork collision processing strategy as the first collision processing strategy or the second collision processing strategy.

Specifically, the first collision processing strategy includes: controlling the movement speed of the fork to zero, which specifically means reducing the movement speed of the fork to zero in a short time through emergency braking or the like. The movement speed of the fork can specifically include an ascending/descending speed, a stretch/retraction speed, and a rotation speed of the fork. The movement speed of the fork being zero means that the ascending/descending speed of the fork is zero, the stretch/retraction speed is zero, and the rotation speed is zero. That is to say, at this time, the control terminal controls the fork to be in a static state, to prevent a further collision between the fork and an obstacle.

The second collision processing strategy is based on the first collision processing strategy, and is to further control the first driving element configured to drive the fork to rotate to stop driving the fork to rotate, so that the fork is in the free rotating state. The free rotating state means that if the fork is further subjected to an external force, the fork may rotate along a fixed axis of rotation through the external force, to alleviate the external force. Therefore, even if the fork is further subjected to the external force, the external force can be alleviated through free rotation to avoid damage to the fork, thereby keeping the fork and the robot in a stable state.

In some embodiments, the control terminal may determine the fork collision processing strategy as the first collision processing strategy or the second collision processing strategy depending on whether the fork is loaded with goods.

Specifically, when determining that the fork is currently loaded with goods, the control terminal determines the fork collision processing strategy as the first collision processing strategy, that is, the control terminal controls the fork to be in a static state. In this way, not only the fork can be prevented from a further collision with the obstacle, but also the fork can be still kept in the static state even if the fork is further subjected to the external force. In this way, a case that the external force causes the state of the fork to change and therefore causes the goods to fall off can be avoided, thereby ensuring the safety of the goods.

For example, if the fork is loaded with fragile items such as glass products, controlling the fork to keep the static state can prevent the fragile items from falling off as a result of the external force, thereby ensuring the safety of the goods.

In addition, when determining that the fork is currently not loaded with goods, the control terminal determines the fork collision processing strategy as the second collision processing strategy. That is to say, in this case, the fork is in the free rotating state. Since the fork is currently not loaded with goods, even if the fork rotates through the external force, fall-off of goods will not occur, thereby avoiding property losses.

In some embodiments, when the fork is loaded with goods, the control terminal may alternatively determine the fork collision processing strategy as the first collision processing strategy or the second collision processing strategy depending on whether a weight of the goods loaded in the fork.

Specifically, a sensor may be arranged on a tray of the robot to obtain weight data of the goods loaded in the fork, and the sensor can transmit the measured weight data to the control terminal. After obtaining the weight data of the goods, the control terminal compares the weight data of the goods with a preset weight. If the weight data of the goods exceeds the preset weight, it indicates that the goods are heavy. In this case, even if the fork rotates through the external force, the goods are unlikely to fall off. Therefore, the control terminal may determine the collision processing strategy as the second collision processing strategy, that is, the fork can be in the free rotating state.

In addition, if the weight data of the goods does not exceed the preset weight, it indicates that the goods are light. In this case, when the fork rotates through the external force, the goods are likely to fall off. Therefore, the control terminal may determine the collision processing strategy as the first collision processing strategy. That is to say, the fork is controlled to be in the static state.

In this embodiment, the control terminal determines the first collision processing strategy or the second collision processing strategy according to the collision type. Specifically, the control terminal may determine the to-be-used collision processing strategy depending on whether the fork is currently loaded with goods. In this way, not only damage to the fork is prevented, but also fall-off of the goods is prevented, thereby ensuring the safety of the goods and avoiding property losses.

In some embodiments, when the collision type is the collision with the telescopic arm stretched, the determination of the fork collision processing strategy according to the collision type includes: determining a third collision processing strategy according to the collision type; or determining a fourth collision processing strategy according to the collision type; or determining a fifth collision processing strategy according to the collision type; or determining a sixth collision processing strategy according to the collision type.

The third collision processing strategy includes: controlling a stretch/retraction speed of the telescopic arm to be zero.

The fourth collision processing strategy includes: controlling the stretch/retraction speed of the telescopic arm to be zero, and controlling a first driving element configured to drive the fork to rotate to stop driving the fork to rotate, so that the fork is in a free rotating state.

The fifth collision processing strategy includes: controlling the stretch/retraction speed of the telescopic arm to be zero, and controlling a second driving element configured to drive the telescopic arm to stretch/retract to stop driving the telescopic arm to stretch/retract, so that the telescopic arm is in a free stretching/retracting state.

The sixth collision processing strategy includes: controlling the stretch/retraction speed of the telescopic arm to be zero, and controlling the first driving element configured to drive the fork to rotate to stop driving the fork to rotate, so that the fork is in the free rotating state; and controlling the second driving element configured to drive the telescopic arm to stretch/retract to stop driving the telescopic arm to stretch/retract, so that the telescopic arm is in the free stretching/retracting state.

Specifically, when it is detected that the fork encounters a collision, the control terminal determines that the collision type is the collision with the telescopic arm stretched if the telescopic arm is in the stretched state. In this case, the control terminal may determine the fork collision processing strategy as the third collision processing strategy, the fourth collision processing strategy, the fifth collision processing strategy, or the sixth collision processing strategy.

Specifically, the third collision processing strategy includes: controlling the stretch/retraction speed of the telescopic arm to be zero. Since the telescopic arm is intended to push the goods placed on the tray out of the tray or pull the goods to the tray, when the stretch/retraction speed of the telescopic arm is zero, the fork will not move in a stretch/retraction direction, thereby avoiding a further collision between the fork and the obstacle.

The fourth collision processing strategy is based on the third collision processing strategy, and is to further control the first driving element configured to drive the fork to rotate to stop driving the fork to rotate, so that the fork is in the free rotating state. The free rotating state means that if the fork is further subjected to an external force, the fork may rotate along a fixed axis of rotation through the external force, to alleviate the external force. Therefore, even if the fork is further subjected to the external force, the external force can be alleviated through free rotation to avoid damage to the fork, thereby keeping the fork and the robot in a stable state.

The fifth collision processing strategy is based on the third collision processing strategy, and is to further control the second driving element configured to drive the telescopic arm to stretch/retract to stop driving the telescopic arm to stretch/retract, so that the telescopic arm is in the free stretching/retracting state. The free stretching/retracting state means that if the fork is further subjected to an external force, the telescopic arm in the fork may stretch/retract in the stretch/retraction direction through the external force, to alleviate the external force. Therefore, even if the fork is further subjected to the external force, the external force can be alleviated through movement in the stretch/retraction direction to avoid damage to the fork, thereby keeping the fork and the robot in a stable state.

The sixth collision processing strategy is based on the third collision processing strategy, and is to further control the stretch/retraction speed of the telescopic arm to be zero and control the first driving element configured to drive the fork to rotate to stop driving the fork to rotate, so that the fork is in the free rotating state; and control the second driving element configured to drive the telescopic arm to stretch/retract to stop driving the telescopic arm to stretch/retract, so that the telescopic arm is in the free stretching/retracting state. Therefore, even if the fork is further subjected to the external force, the external force can be alleviated through free rotation and movement in the stretch/retraction direction to avoid damage to the fork, thereby keeping the fork and the robot in a stable state.

In some embodiments, the control terminal may determine the fork collision processing strategy as the third collision processing strategy, the fourth collision processing strategy, the fifth collision processing strategy, or the sixth collision processing strategy depending on whether the fork is loaded with goods.

Specifically, when determining that the fork is currently loaded with goods, the control terminal determines the fork collision processing strategy as the third collision processing strategy, that is, the control terminal controls the stretch/retraction speed of the telescopic arm to be zero. In this way, not only the fork can be prevented from a further collision with the obstacle, but also the fork will not move in the stretch/retract direction even if the fork is further subjected to the external force since the stretch/retraction speed of the telescopic arm is zero. In this way, a case that the external force causes the fork to move and therefore causes the goods to fall off can be avoided, thereby ensuring the safety of the goods.

For example, if the fork is loaded with fragile items such as glass products, controlling the stretch/retraction speed of the telescopic arm to be zero can avoid a case that the external force causes the fork to move and therefore causes the goods to fall off, thereby ensuring the safety of the goods.

In addition, when determining that the fork is currently not loaded with goods, the control terminal determines the fork collision processing strategy as the fourth collision processing strategy, the fifth collision processing strategy, or the sixth collision processing strategy. That is to say, in this case, the fork is in the free rotating state, or the telescopic arm is in the free stretching/retracting state, or the telescopic arm is in the free stretching/retracting state while the fork is in the free rotating state. Since the fork is currently not loaded with goods, even if the fork rotates and/or moves in the stretch/retraction direction of the telescopic arm through the external force, fall-off of goods will not occur, thereby avoiding property losses.

Optionally, when determining that the fork is currently not loaded with goods, the control terminal may determine the fork collision processing strategy based on a direction of the external force on the fork during the collision.

Specifically, a plurality of pressure sensors may be arranged in each direction of the fork. In case of a collision, the control terminal may determine the direction of the external force on the fork according to pressure data of the plurality of pressure sensors, and then determine the fork collision processing strategy according to the direction of the external force.

When only an external force in a direction the same as the rotation direction of the fork exists, the control terminal may determine the fork collision processing strategy as the fourth collision processing strategy. That is to say, the fork is in the free rotating state, so that the fork can freely rotate through the external force to alleviate the external force.

In addition, when only an external force in a direction the same as the stretch/retraction direction of the telescopic arm exists, the control terminal may determine the fork collision processing strategy as the fifth collision processing strategy. That is to say, the telescopic arm is in the free stretching/retracting state, so that the telescopic arm can freely stretch/retract through the external force to alleviate the external force.

Moreover, when the external force in the direction the same as the rotation direction of the fork and the external force in the direction the same as the stretch/retraction direction of the telescopic arm both exist, the control terminal may determine the fork collision processing strategy as the sixth collision processing strategy. That is to say, the fork is in the free rotating state and the telescopic arm is in the free stretching/retracting state, so that the fork can freely rotate and the telescopic arm can freely stretch/retract through the external force to alleviate the external force.

It may be understood that the direction of the external force being the same as the rotation direction of the fork may specifically mean that the two directions may be identical or that an included angle between the two directions is less than a preset angle. The same is true for the direction of the external force being the same as the stretch/retraction direction of the telescopic arm.

In this embodiment, the control terminal determines the third collision processing strategy, the fourth collision processing strategy, the fifth collision processing strategy, or the sixth collision processing strategy according to the collision type. Specifically, the control terminal may determine the to-be-used collision processing strategy depending on whether the fork is currently loaded with goods. In this way, not only damage to the fork is prevented, but also fall-off of the goods is prevented, thereby ensuring the safety of the goods.

In some embodiments, it is determined in at least one of the following ways that the fork of the robot encounters a collision: an increase margin of an operating current of a driving element reaches a first preset threshold, and a duration for which a situation that the increase margin of the operating current of the driving element reaches the first preset threshold lasts reaches a first preset duration; or a decrease margin of the movement speed of the fork reaches a second preset threshold; or the increase margin of the operating current of the driving element reaches a third preset threshold, a duration for which a situation that the increase margin of the operating current of the driving element reaches the third preset threshold lasts reaches a second preset duration, and the decrease margin of the movement speed of the fork reaches a fourth preset threshold; or a change margin of a pressure detected by a pressure sensor arranged on the fork reaches a fifth preset threshold.

The driving element includes at least one of the first driving element configured to drive the fork to rotate, the second driving element configured to drive the telescopic arm to stretch/retract, and a third driving element configured to drive the fork to ascend/descend.

Specifically, a movement type of the fork may include rotation, stretch/retraction of the telescopic arm, and ascending/descending. During control of a movement state of the fork, the control terminal may control the fork to rotate by controlling the first driving element, control the telescopic arm of the fork to stretch/retract by controlling the second driving element, and control the fork to ascend/descend by controlling the third driving element.

When the control terminal controls the fork to normally rotate, stretch/retract, or ascend/descend, an operating current of each driving element is at a normal operating value. If the fork collides with an obstacle, the fork is subjected to an external force (from the obstacle) during the normal rotation, stretch/retraction, or ascending/descending. At this time, the driving element requires a larger operating current to overcome the external force. That is to say, the operating current is increased to some extent. Therefore, when the increase margin of the operating current reaches the first preset threshold and the duration for which a situation that the increase margin of the operating current of the driving element reaches the first preset threshold lasts reaches the first preset duration, it may be determined that the fork encounters a collision. Therefore, by detecting a change of the operating current of the driving element, whether the fork of the robot encounters a collision may be determined. In addition, by setting a duration condition, erroneous determination made by the control terminal that the fork encounters a collision as a result of unexpected events such as a sudden current change may be avoided, thereby improving the accuracy of a fork collision detection result.

Moreover, during the normal rotation, stretch/retraction, or ascending/descending of the fork, the movement speed of the fork is at a normal speed value. If the fork collides with an obstacle, the fork is subjected to an external force (from the obstacle) during the normal rotation, stretch/retraction, or ascending/descending. At this time, the driving element requires a larger operating current to overcome the external force. At this time, the movement speed of the fork will decrease. Therefore, when the decrease margin of the movement speed of the fork reaches the second preset threshold, it may be determined that the fork encounters a collision.

Therefore, by detecting a change of the movement speed of the fork, whether the fork of the robot encounters a collision may be determined.

In addition, whether the fork of the robot encounters a collision may be determined according to both the change of the operating current of the driving element and the change of the movement speed of the fork. Specifically, when the increase margin of the operating current of the driving element reaches the third preset threshold, the duration for which a situation that the increase margin of the operating current of the driving element reaches the third preset threshold lasts reaches the second preset duration, and the decrease margin of the movement speed of the fork reaches the fourth preset threshold, it may be determined that the fork encounters a collision.

The third preset threshold may be the same as or different from the first preset threshold. The second preset duration may be the same as or different from the first preset duration. The fourth preset threshold may be the same as or different from the second preset threshold.

In addition, a pressure sensor may be further mounted to the fork. During the normal rotation, stretch/retraction, or ascending/descending of the fork, if the fork collides with an obstacle, the obstacle first contacts the pressure sensor mounted to the fork. An external force (from the obstacle) causes a pressure detected by the pressure sensor to change. Therefore, when the change margin of the pressure detected by the pressure sensor reaches the fifth preset threshold, it may be determined that the fork encounters a collision. Therefore, by detecting the change of the pressure detected by the pressure sensor mounted to the fork, whether the fork of the robot encounters a collision may be determined.

In this embodiment, the control terminal may perform collision detection through the change of the operating current of the driving element, the change of the movement speed of the fork, and the change of the pressure detected by the pressure sensor, so as to accurately detect whether the fork encounters a collision, thereby facilitating fork collision processing and protecting the fork.

In some embodiments, the method further includes: identifying an obstacle in collision and processing the obstacle according to an identification result after it is detected that the fork of the robot encounters a collision.

Specifically, after detecting that the fork of the robot encounters a collision, the control terminal may further identify information such as a type of the obstacle and process the obstacle according to the identification result of the obstacle, in addition to processing the fork collision event according to the fork collision processing strategy, so as to prevent a collision between the obstacle and other robots, thereby ensuring the safety of the robot or the obstacles.

For example, the control terminal may invoke a camera arranged on the robot to capture an image of the obstacle, and then identify the obstacle through a target identification technology, to obtain the identification result of the obstacle. It may be understood that the control terminal may identify the obstacle in other ways, for example, identify an electronic label of goods through a radio frequency identification (RFID) technology. This is not specifically limited herein.

In some embodiments, the processing of the obstacle according to the identification result includes: determining a goods type of the obstacle according to the identification result when the obstacle is goods; and carrying the obstacle to a corresponding goods storage position according to the goods type of the obstacle.

Specifically, after identifying the obstacle, if determining that the obstacle is goods, the control terminal further determines the goods type of the obstacle according to the identification result, and determines the goods storage position corresponding to the goods. Therefore, the control terminal controls the robot to carry the goods to the corresponding goods storage position, which can ensure proper goods storage while implementing processing of the obstacle.

In some embodiments, the method further includes: executing a fork collision avoidance strategy when it is detected that the fork is about to encounter a collision.

Specifically, during the operation of the robot, the control terminal may further detect whether the fork is about to encounter a collision and execute the fork collision avoidance strategy when detecting that the fork is about to encounter a collision, so as to avoid the fork collision and protect the fork in advance.

In some embodiments, it is determined in the following way that the fork of the robot is about to encounter a collision: it is determined that the obstacle is on a movement path of the fork based on a distance between the fork and the obstacle and a current movement state of the fork.

Specifically, the robot is equipped with a sensor for distance measurement, such as a photoelectric sensor, a distance sensor, or an ultrasonic radar sensor. The control terminal may obtain the distance between the fork and the obstacle through the sensor for distance measurement. Then the control terminal may obtain the movement path of the fork according to a current movement state of the fork. Finally, the control terminal determines whether the obstacle is located on the movement path of the fork based on the distance between the fork and the obstacle and the movement path of the fork.

If the control terminal determines that the obstacle is located on the movement path of the fork, it indicates that the fork will collide with the obstacle when moving along the current movement path. In this case, the control terminal may execute the fork collision avoidance strategy.

If the control terminal determines that the obstacle is not located on the movement path of the fork, it indicates that the fork will not collide with the obstacle when moving along the current movement path. In this case, the control terminal does not need to execute the fork collision avoidance strategy.

The current movement state of the fork may be rotating, stretching/retracting, or ascending/descending. Correspondingly, the path of the fork may be a rotation path, a stretch/retraction path, or an ascending/descending path of the fork.

Figure 4:
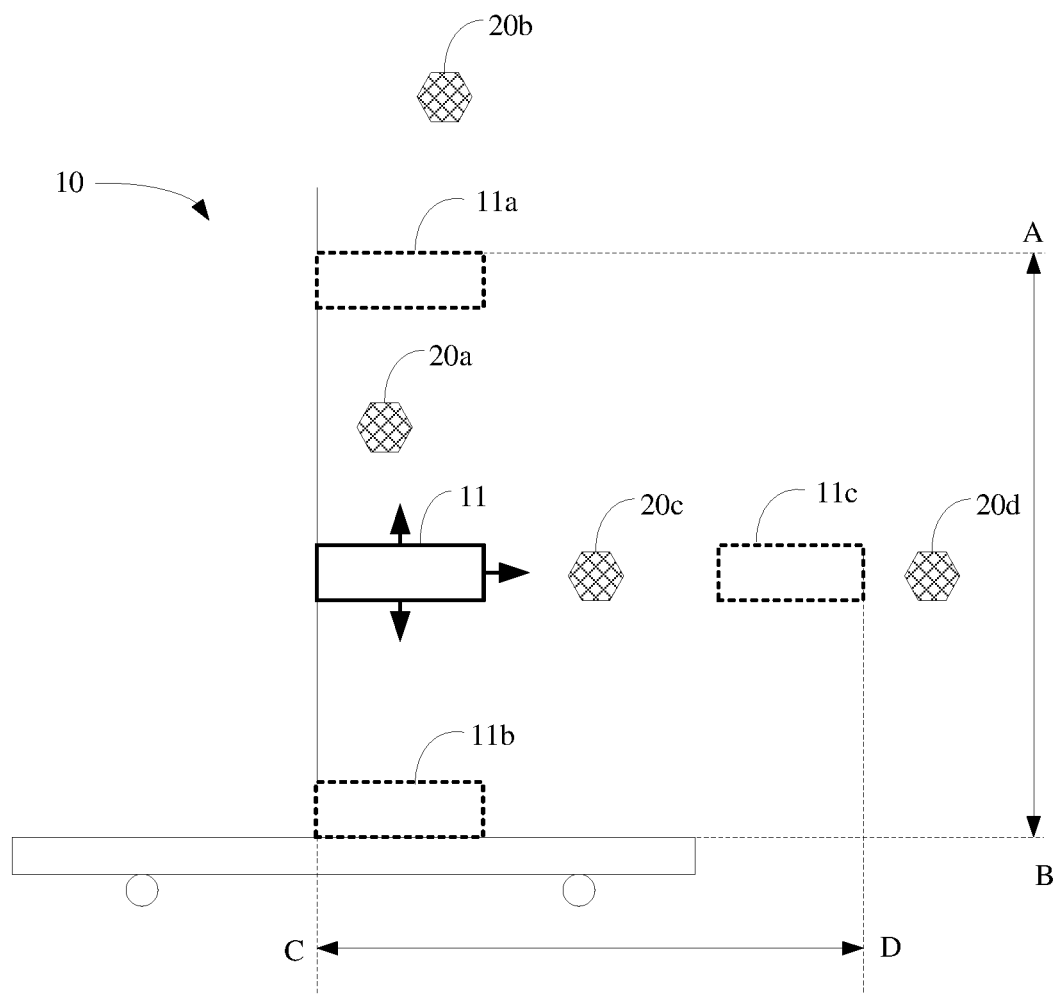
FIG. 4 is an example diagram of a position relationship between a fork and an obstacle according to an embodiment of this application.

For example, FIG. 4 is an example diagram of a position relationship between a fork and an obstacle according to an embodiment of this application. As shown in FIG. 4, a robot 10 is equipped with a fork 11 (for ease of understanding, other structures are not shown). The fork 11 may ascend/descend within an A-B height range in the figure and stretch/retract within a C-D length range in the figure under control of a control terminal. In addition, the figure includes four obstacles, 20a, 20b, 20c, and 20d.

Specifically, the control terminal may control, through a third driving element, the fork 11 to move up (that is, ascend) in a direction B→A to a position of a fork 11a. The position of the fork 11a is a highest position to which the fork 11 may ascend.

During the ascending, a movement path of the fork 11 is from a current position of the fork 11 to the position of the fork 11a. In this case, for an obstacle 20a, the control terminal determines that the obstacle 20a is located on the movement path of the fork 11 based on a distance between the fork 11 and the obstacle 20a and the current movement state of the fork. Therefore, the control terminal may determine that the fork 11 is about to collide with the obstacle 20a.

For the obstacle 20b, the control terminal determines that the obstacle 20b is not located on the movement path of the fork 11 based on a distance between the fork 11 and the obstacle 20b and the current movement state of the fork. Therefore, the control terminal may determine that the fork 11 will not collide with the obstacle 20b.

Moreover, the control terminal may control, through the third driving element, the fork 11 to move down (that is, descend) in a direction A→B to a position of a fork 11b. The position of the fork 11b is a lowest position to which the fork 11 may descend.

Furthermore, the control terminal may control, through the second driving element, the telescopic arm of the fork 11 to stretch/retract in a direction C→D, to cause the fork 11 to move to a position of a fork 11d. The position of the fork 11d is a farthest position to which the fork 11 may stretch. For the obstacle 20c, the control terminal determines that the obstacle 20c is located on the movement path of the fork 11 based on a distance between the fork 11 and the obstacle 20c and the current movement state of the fork. Therefore, the control terminal may determine that the fork 11 is about to collide with the obstacle 20c.

For the obstacle 20d, the control terminal determines that the obstacle 20d is not located on the movement path of the fork 11 based on a distance between the fork 11 and the obstacle 20d and the current movement state of the fork. Therefore, the control terminal may determine that the fork 11 will not collide with the obstacle 20d.

In this embodiment, when determining that the obstacle is on the movement path of the fork based on the distance between the fork and the obstacle and the current movement state of the fork, the control terminal may determine that the fork of the robot is about to encounter a collision, so that the control terminal executes the fork collision avoidance strategy to prevent the fork from colliding with the obstacle, thereby protecting the fork in advance.

In some embodiments, the executing a fork collision avoidance strategy includes: adjusting a position of the fork according to a position of the obstacle so that the fork does not collide with the obstacle.

Specifically, when determining that an obstacle is located on the movement path of the fork, the control terminal may adjust the position of the fork based on the position of the obstacle, to prevent the fork from colliding with the obstacle during movement, thereby protecting the fork in advance.

In some embodiments, the adjusting a position of the fork according to a position of the obstacle so that the fork does not collide with the obstacle includes: adjusting a movement path of the fork when the obstacle is located on the movement path of the fork, so that the obstacle is not located on the movement path of the fork; controlling the fork to move along the movement path to a preset position and outputting obstacle prompt information when the obstacle is located on the movement path of the fork, where the preset position is a position on the movement path at a preset distance to the obstacle.

When determining that an obstacle is located on the movement path of the fork, the control terminal may adjust the movement path of the fork so that the obstacle is not on the movement path of the fork. In this way, the fork will not collide with the obstacle during movement, thereby avoiding the obstacle and achieving automatic obstacle avoidance.

Specifically, when adjusting the movement path of the fork, the control terminal may adjust a position of the robot, that is, control a mobile chassis of the robot to move. Since the fork is mounted to the robot, when the position of the robot changes, the movement path of the fork changes, thereby avoiding the obstacle.

Figure 5A:
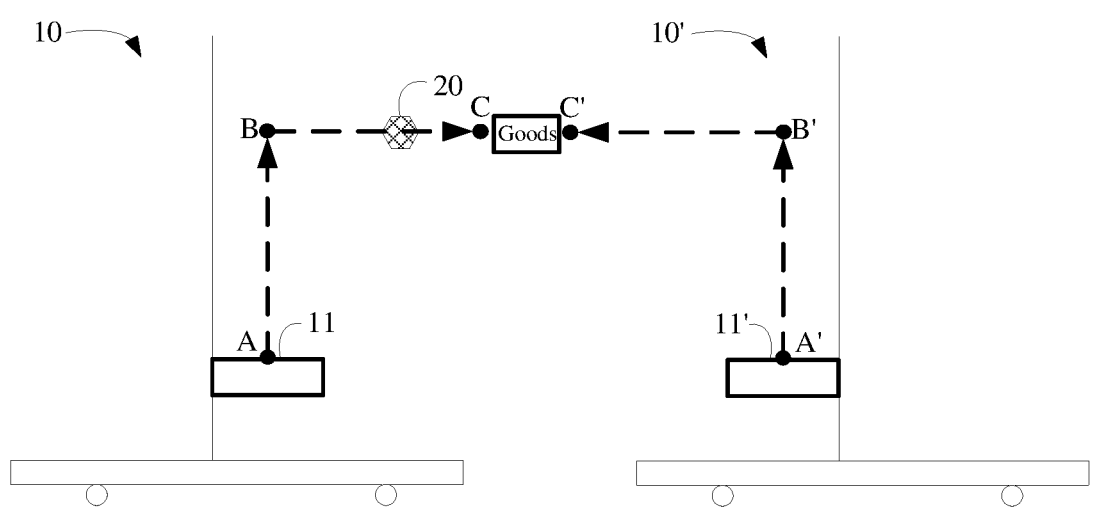
FIG. 5a is a schematic diagram in which a control terminal controls a fork to avoid an obstacle.

For example, FIG. 5a is a schematic diagram in which a control terminal controls a fork to avoid an obstacle. As shown in FIG. 5a, during taking of goods by the robot 10, the control terminal controls the movement path of the fork 11 to be A-B-C. A-B is a movement path for controlling the fork 11 to ascend/descend (specifically, ascend), and B-C is a movement path for controlling the telescopic arm of the fork 11 to stretch/retract (specifically, stretch). However, since the obstacle 20 exists and the obstacle 20 is located on the movement path B-C, the control terminal determines that the obstacle 20 will collide with the fork 11. Therefore, the control terminal may control the robot 10 to move. For example, a robot after the movement is a robot 10' shown in the figure after position movement, and correspondingly, a fork after the movement is a fork 11' shown in the figure. Therefore, the fork 11' may move according to a movement path of A'-B'-C' shown in the figure to rake goods, and can successfully avoid the obstacle 20.

In addition, when determining that the obstacle is located on the movement path of the fork, the control terminal may alternatively control the fork to move along the movement path to the preset position at the preset distance to the obstacle, and output the obstacle prompt information to remind relevant personnel to process the obstacle. After the obstacle is processed, the control terminal may control the fork to continue to move along the original movement path.

Figure 5B:
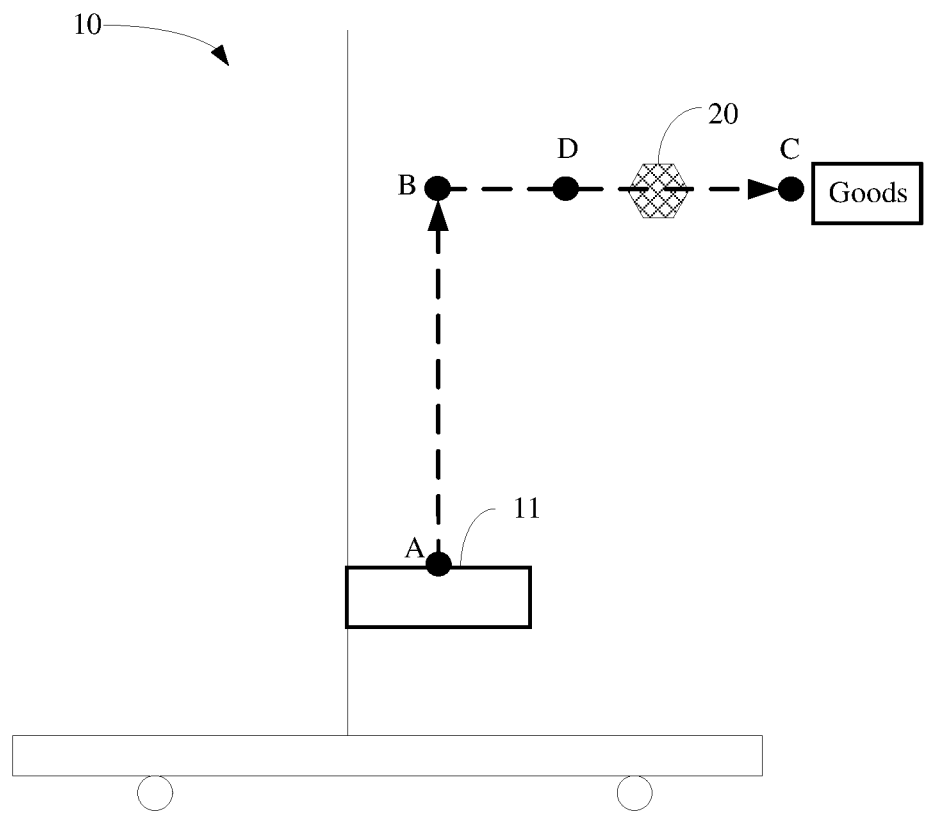
FIG. 5b is another schematic diagram in which a control terminal controls a fork to avoid an obstacle.

For example, FIG. 5b is another schematic diagram in which a control terminal controls a fork to avoid an obstacle. As shown in FIG. 5b, during taking of goods by the robot 10, the control terminal controls the movement path of the fork 11 to be A-B-C. A-B is a movement path for controlling the fork 11 to ascend/descend (specifically, ascend), and B-C is a movement path for controlling the telescopic arm of the fork 11 to stretch/retract (specifically, stretch). However, since the obstacle 20 exists and the obstacle 20 is located on the movement path B-C, the control terminal determines that the obstacle 20 will collide with the fork 11. Therefore, the control terminal may control the fork 11 to first move to a position of a point D at a preset distance to the obstacle in the figure, and output obstacle prompt information. After the obstacle is processed, the fork 11 is controlled to move from the point D to a point C. Alternatively, after the fork 11 moves to a position of the point D in the figure at a preset distance to the obstacle, the robot moves the obstacle 20 to a storage unit thereof, and then controls the fork 11 to move to the point C to avoid collision with the obstacle, thereby protecting the fork.

It is to be understood that, although the steps in the flowcharts of the above embodiments are shown in order as indicated by the arrows, the steps are not necessarily performed in the order indicated by the arrows. Unless explicitly specified in this specification, execution of the steps is not strictly limited to the order, and the steps may be performed in other order. In addition, at least some steps in the flowcharts in the drawings may include a plurality of substeps or a plurality of stages. The substeps or the stages are not necessarily performed at the same moment, but may be performed at different moments. The substeps or the stages are not necessarily performed in sequence, but may be performed in turn or alternately with another step or at least some of substeps or stages of the another step.

In some embodiments, a fork collision processing apparatus is provided.

Figure 6:
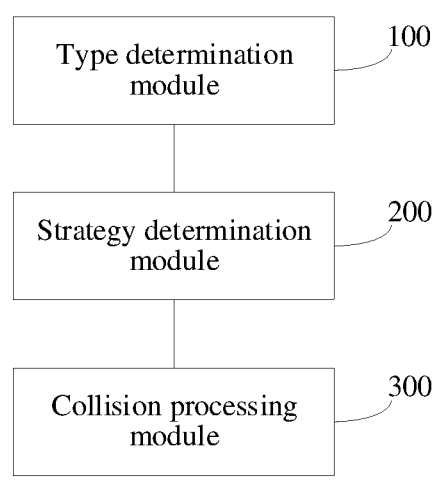
FIG. 6 is a schematic diagram of a fork collision processing apparatus according to an embodiment of this application.

FIG. 6 is a schematic diagram of a fork collision processing apparatus according to an embodiment of this application. As shown in FIG. 6, the apparatus includes:

a type determination module 100, configured to determine a collision type when it is detected that a fork of a robot encounters a collision;

a strategy determination module 200, configured to determine a fork collision processing strategy according to the collision type; and a collision processing module 300, configured to process the fork collision according to the fork collision processing strategy.

For a specific limitation on the fork collision processing apparatus, reference may be made to the limitation on the fork collision processing method in the above, and the details are not described herein. All or some of modules in the fork collision processing apparatus may be implemented by software, a hardware, or a combination thereof. The above modules may be built in or independent of a processor of a computer device in a form of hardware, or may be stored in a memory of the computer device in a form of software, so that the processor invokes and performs an operation corresponding to each of the modules.

According to the fork collision processing apparatus provided in this application, when it is detected that the fork of the robot encounters a collision, the collision type of the fork collision is first determined, then the fork collision processing strategy is determined according to the determined collision type, and finally the fork collision event is processed according to the determined fork collision processing strategy. Compared with the practice that the robot continues to control the fork to perform actions, in this application, the fork collision event may be processed according to the collision type of the fork collision, so that the fork can be effectively protected from being damaged, thereby reducing the device maintenance costs.

In some embodiments, the collision type includes a collision with a telescopic arm stretched and a collision with the telescopic arm not stretched.

In some embodiments, the strategy determination module 200 is further configured to: when the collision type is the collision with the telescopic arm not stretched, determine a first collision processing strategy according to the collision type; or determine a second collision processing strategy according to the collision type.

The first collision processing strategy includes: controlling a movement speed of the fork to be zero.

The second collision processing strategy includes: controlling the movement speed of the fork to be zero, and controlling a first driving element configured to drive the fork to rotate to stop driving the fork to rotate, so that the fork is in a free rotating state.

In some embodiments, the strategy determination module 200 is further configured to: determine the first collision processing strategy according to the collision type when the fork is loaded with goods; and determine the second collision processing strategy according to the collision type when the fork is not loaded with goods.

In some embodiments, the strategy determination module 200 is further configured to: when the collision type is the collision with the telescopic arm stretched, determine a third collision processing strategy according to the collision type; or determine a fourth collision processing strategy according to the collision type; or determine a fifth collision processing strategy according to the collision type; or determine a sixth collision processing strategy according to the collision type.

The third collision processing strategy includes: controlling a stretch/retraction speed of the telescopic arm to be zero.

The fourth collision processing strategy includes: controlling the stretch/retraction speed of the telescopic arm to be zero, and controlling a first driving element configured to drive the fork to rotate to stop driving the fork to rotate, so that the fork is in a free rotating state.

The fifth collision processing strategy includes: controlling the stretch/retraction speed of the telescopic arm to be zero, and controlling a second driving element configured to drive the telescopic arm to stretch/retract to stop driving the telescopic arm to stretch/retract, so that the telescopic arm is in a free stretching/retracting state.

The sixth collision processing strategy includes: controlling the stretch/retraction speed of the telescopic arm to be zero, and controlling the first driving element configured to drive the fork to rotate to stop driving the fork to rotate, so that the fork is in the free rotating state; and controlling the second driving element configured to drive the telescopic arm to stretch/retract to stop driving the telescopic arm to stretch/retract, so that the telescopic arm is in the free stretching/retracting state.

In some embodiments, the strategy determination module 200 is further configured to: determine the third collision processing strategy according to the collision type when the fork is loaded with goods; and determine the fourth collision processing strategy, the fifth collision processing strategy, or the sixth collision processing strategy according to the collision type when the fork is not loaded with goods.

In some embodiments, it is determined in at least one of the following ways that the fork of the robot encounters a collision:
   an increase margin of an operating current of a driving element reaches a situation that the increase margin of the operating current of the driving element reaches a first preset threshold, and a duration for which the first preset threshold lasts reaches a first preset duration; or
   a decrease margin of the movement speed of the fork reaches a second preset threshold; or
   the increase margin of the operating current of the driving element reaches a third preset threshold, a duration for which a situation that the increase margin of the operating current of the driving element reaches the third preset threshold lasts reaches a second preset duration, and the decrease margin of the movement speed of the fork reaches a fourth preset threshold; or
   a change margin of a pressure detected by a pressure sensor arranged on the fork reaches a fifth preset threshold.

The driving element includes at least one of the first driving element configured to drive the fork to rotate, the second driving element configured to drive the telescopic arm to stretch/retract, and a third driving element configured to drive the fork to ascend/descend.

In some embodiments, the fork collision processing apparatus further includes: an obstacle processing module, configured to identify an obstacle in collision and process the obstacle according to an identification result after it is detected that the fork of the robot encounters a collision.

In an embodiment, the obstacle processing module is further configured to: determine a goods type of the obstacle according to the identification result when the obstacle is goods; and carry the obstacle to a corresponding goods storage position according to the goods type of the obstacle.

In some embodiments, the fork collision processing apparatus further includes: a collision avoidance module, configured to execute a fork collision avoidance strategy when it is detected that the fork is about to encounter a collision.

In some embodiments, it is determined in the following way that the fork of the robot is about to encounter a collision:
   it is determined that the obstacle is on a movement path of the fork based on a distance between the fork and the obstacle and a current movement state of the fork.

In some embodiments, the collision avoidance module is further configured to: adjust a position of the fork according to a position of the obstacle so that the fork does not collide with the obstacle.

In some embodiments, the collision avoidance module is further configured to: adjust a movement path of the fork when the obstacle is located on the movement path of the fork, so that the obstacle is not located on the movement path of the fork; or control the fork to move along the movement path to a preset position and output obstacle prompt information when the obstacle is located on the movement path of the fork, where the preset position is a position on the movement path at a preset distance to the obstacle.

In some embodiments, a robot is provided, including a fork and the fork collision processing apparatus described above.

Figure 7:
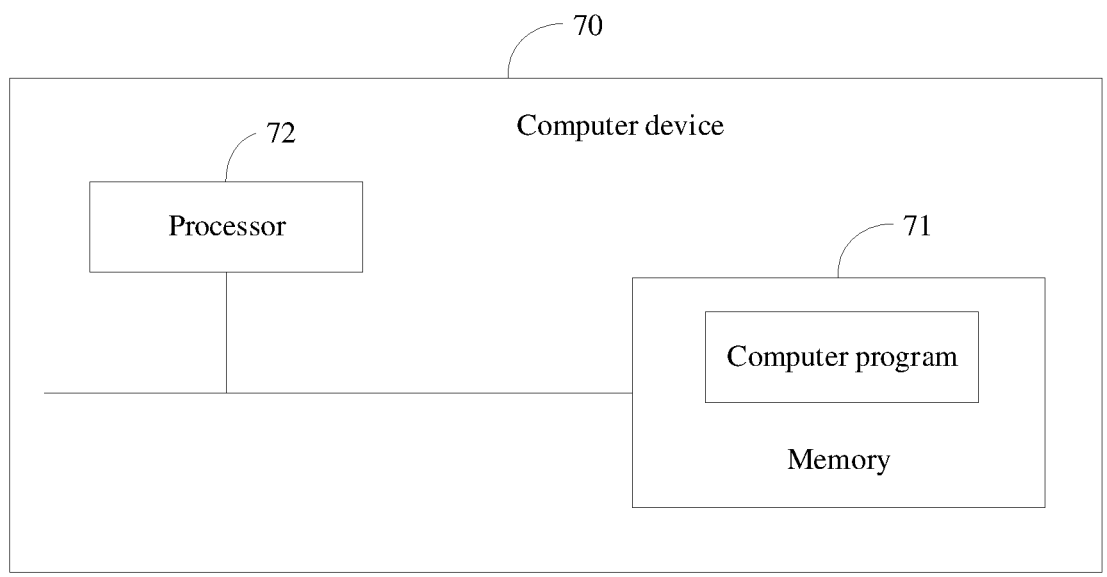
FIG. 7 is a schematic diagram of a computer device according to an embodiment of this application.

In some embodiments, a computer device is provided. FIG. 7 is a schematic diagram of a computer device according to an embodiment of this application. As shown in FIG. 7, the computer device includes a memory 71, a processor 72, and a computer program stored in the memory 71 and executable in the processor 72, where when the processor 72 executes the program, the above fork collision processing method is implemented.

The memory and the processor are electrically connected directly or indirectly to realize data transmission or exchange. For example, the elements may be electrically connected to each other through one or more communication buses or signal lines, for example, may be connected through buses. The memory stores computer execution instructions for implementing a fork collision processing method, including at least one software function module that may be stored in the memory in a form of software or firmware. The processor executes various functional applications and data processing by running software programs and modules stored in the memory.

The memory may be but is not limited to a random access memory (RAM), a read-only memory (ROM), a programmable read-only memory (PROM), an erasable programmable read-only memory (EPROM), or an electrically erasable programmable read-only memory (EEPROM). The memory is configured to store programs, and the processor executes the programs after receiving executable instructions. Further, the software programs and modules in the above memory may further include an operating system, which may include various software components and/or drivers for managing system tasks (such as memory management, storage device control, and power management), and may communicate with various hardware or software components to provide an operating environment for other software components.

The processor may be an integrated circuit chip and has a signal processing capability. The processor may be a general-purpose processor, including a central processing unit (CPU), a network processor (NP), and the like. The processor may implement or perform the methods, the steps, and logic block diagrams disclosed in the embodiments of this application. The general-purpose processor may be a microprocessor, or the processor may be any conventional processor or the like.

In some embodiments, a computer-readable storage medium is provided, which stores computer-executable instructions that, when executed by a processor, implement the above fork collision processing method.

In some embodiments, a computer program product is provided, which includes a computer program that, when executed by a processor, implements the above fork collision processing method.

A person of ordinary skill in the art may understand that all or some of processes of the method in the above embodiment may be implemented by instructing relevant hardware through a computer program. The computer program may be stored in a non-volatile computer-readable storage medium. The computer program, when executed, may include the processes of the embodiments of the methods described above. Any reference to the memory, the storage, the database, or other media used in the embodiments provided in this application may include a non-volatile memory or a volatile memory. The non-volatile memory may include a ROM, a programmable ROM (PROM), an electrically programmable ROM (EPROM), an electrically erasable programmable ROM (EEPROM), or a flash memory. The volatile memory may include a RAM or an external cache. By way of description rather than limitation, the RAM may be obtained in a plurality of forms, such as a static RAM (SRAM), a dynamic RAM (DRAM), a synchronous DRAM (SDRAM), a double data rate SDRAM (DDRSDRAM), an enhanced SDRAM (ESDRAM), a synchlink DRAM (SLDRAM), a Rambus direct RAM (RDRAM), a direct Rambus dynamic RAM (DRDRAM), and a Rambus dynamic RAM (RDRAM).

A person skilled in the art can easily figure out other implementations of this application after considering the description and practicing this application that is disclosed herein. This application is intended to cover any variations, usages, or adaptive changes of the present disclosure. These variations, usages, or adaptive changes follow the general principles of the present disclosure and include common general knowledge or common technical means in the art not disclosed in the present disclosure. The description and the embodiments are considered as merely exemplary, and the scope and spirit of the present disclosure are indicated by the following claims.

It is to be understood that the present disclosure is not limited to the precise structures described above and shown in the drawings, and various modifications and changes may be made without departing from the scope of the present disclosure. The scope of the present disclosure is limited only by the appended claims.

What is claimed is:

1. A fork collision processing method, comprising:
   determining a collision type when it is detected that a fork of a robot encounters a collision;
   determining a fork collision processing strategy according to the collision type; and
   processing the fork collision according to the fork collision processing strategy;
   wherein the fork comprises a telescopic arm, the telescopic arm is configured to stretch horizontally, the collision type comprises a collision with the telescopic arm stretched and a collision with the telescopic arm not stretched.

2. The method according to claim 1, wherein when the collision type is the collision with the telescopic arm not stretched, the determining a fork collision processing strategy according to the collision type comprises:
   determining a first collision processing strategy according to the collision type; or
   determining a second collision processing strategy according to the collision type, wherein
   the first collision processing strategy comprises: controlling a movement speed of the fork to be zero; and
   the second collision processing strategy comprises: controlling a movement speed of the fork to be zero, and controlling a first driving element to drive the fork to rotate to stop driving the fork to rotate, so that the fork is in a free rotating state.

3. The method according to claim 2, wherein the first collision processing strategy is determined according to the collision type when the fork is loaded with goods; and
   the second collision processing strategy is determined according to the collision type when the fork is not loaded with goods.

4. The method according to claim 1, wherein when the collision type is the collision with the telescopic arm stretched, the determining a fork collision processing strategy according to the collision type comprises:
   determining a third collision processing strategy according to the collision type; or
   determining a fourth collision processing strategy according to the collision type; or
   determining a fifth collision processing strategy according to the collision type; or
   determining a sixth collision processing strategy according to the collision type, wherein
   the third collision processing strategy comprises: controlling a stretch/retraction speed of the telescopic arm to be zero;
   the fourth collision processing strategy comprises: controlling a stretch/retraction speed of the telescopic arm to be zero, and controlling a first driving element to drive the fork to rotate to stop driving the fork to rotate, so that the fork is in a free rotating state;
   the fifth collision processing strategy comprises: controlling a stretch/retraction speed of the telescopic arm to be zero, and controlling a second driving element to drive the telescopic arm to stretch/retract to stop driving the telescopic arm to stretch/retract, so that the telescopic arm is in a free stretching/retracting state; and
   the sixth collision processing strategy comprises: controlling a stretch/retraction speed of the telescopic arm to be zero, and controlling a first driving element to drive the fork to rotate to stop driving the fork to rotate, so that the fork is in a free rotating state; and controlling a second driving element to drive the telescopic arm to stretch/retract to stop driving the telescopic arm to stretch/retract, so that the telescopic arm is in a free stretching/retracting state.

5. The method according to claim 4, wherein the third collision processing strategy is determined according to the collision type when the fork is loaded with goods; and
   the fourth collision processing strategy, the fifth collision processing strategy, or the sixth collision processing strategy is determined according to the collision type when the fork is not loaded with goods.

6. The method according to claim 1, wherein it is determined in at least one of the following ways that the fork of the robot encounters a collision:

an increase margin of an operating current of a driving element reaches a first preset threshold, and a duration for which a situation that the increase margin of the operating current of the driving element reaches the first preset threshold lasts reaches a first preset duration; or a decrease margin of a movement speed of the fork reaches a second preset threshold; or the increase margin of the operating current of the driving element reaches a third preset threshold, a duration for which a situation that the increase margin of the operating current of the driving element reaches the third preset threshold lasts reaches a second preset duration, and the decrease margin of the movement speed of the fork reaches a fourth preset threshold; or a change margin of a pressure detected by a pressure sensor arranged on the fork reaches a fifth preset threshold, wherein the driving element comprises at least one of a first driving element to drive the fork to rotate, a second driving element configured to drive a telescopic arm to stretch/retract, and a third driving element configured to drive the fork to ascend/descend.

7. The method according to claim 1, further comprising: identifying an obstacle in collision and processing the obstacle according to an identification result after it is detected that the fork of the robot encounters the collision.

8. The method according to claim 7, wherein the processing the obstacle according to an identification result comprises:

determining a goods type of the obstacle according to the identification result when the obstacle is goods; and carrying the obstacle to a corresponding goods storage position according to the goods type of the obstacle.

9. The method according to claim 1, further comprising: executing a fork collision avoidance strategy when it is detected that the fork is about to encounter a collision.

10. A folk collision processing apparatus, comprising: a memory, configured to store a computer program; and at least one processor, configured to execute the computer program;

wherein the computer program comprises following executable computer instructions:

determining a collision type when it is detected that a fork of a robot encounters a collision;

determining a fork collision processing strategy according to the collision type; and processing the fork collision according to the fork collision processing strategy;

wherein the fork comprises a telescopic arm, the telescopic arm is configured to stretch horizontally, the collision type comprises a collision with a telescopic arm stretched and a collision with the telescopic arm not stretched.

11. The apparatus according to claim 10, wherein when the collision type is the collision with the telescopic arm not stretched, the computer program comprises following executable computer instructions:

determining a first collision processing strategy according to the collision type; or determining a second collision processing strategy according to the collision type, wherein the first collision processing strategy comprises: controlling a movement speed of the fork to be zero; and the second collision processing strategy comprises: controlling a movement speed of the fork to be zero, and controlling a first driving element to drive the fork to rotate to stop driving the fork to rotate, so that the fork is in a free rotating state.

12. The apparatus according to claim 11, the first collision processing strategy is determined according to the collision type when the fork is loaded with goods; and the second collision processing strategy is determined according to the collision type when the fork is not loaded with goods.

13. The apparatus according to claim 10, wherein when the collision type is the collision with the telescopic arm stretched, the computer program comprises following executable computer instructions:

determining a third collision processing strategy according to the collision type; or determining a fourth collision processing strategy according to the collision type; or determining a fifth collision processing strategy according to the collision type; or determining a sixth collision processing strategy according to the collision type, wherein the third collision processing strategy comprises: controlling a stretch/retraction speed of the telescopic arm to be zero;

the fourth collision processing strategy comprises: controlling a stretch/retraction speed of the telescopic arm to be zero, and controlling a first driving element to drive the fork to rotate to stop driving the fork to rotate, so that the fork is in a free rotating state;

the fifth collision processing strategy comprises: controlling a stretch/retraction speed of the telescopic arm to be zero, and controlling a second driving element to drive the telescopic arm to stretch/retract to stop driving the telescopic arm to stretch/retract, so that the telescopic arm is in a free stretching/retracting state; and the sixth collision processing strategy comprises: controlling a stretch/retraction speed of the telescopic arm to be zero, and controlling a first driving element to drive the fork to rotate to stop driving the fork to rotate, so that the fork is in a free rotating state; and controlling a second driving element to drive the telescopic arm to stretch/retract to stop driving the telescopic arm to stretch/retract, so that the telescopic arm is in a free stretching/retracting state.

14. The apparatus according to claim 13, wherein the third collision processing strategy is determined according to the collision type when the fork is loaded with goods; and the fourth collision processing strategy, the fifth collision processing strategy, or the sixth collision processing strategy is determined according to the collision type when the fork is not loaded with goods.

15. A robot, comprising a fork and a fork collision processing apparatus;

wherein A folk collision processing apparatus comprises:
a memory, configured to store a computer program; and
at least one processor, configured to execute the computer program;

wherein the computer program comprises following executable computer instructions:

determining a collision type when it is detected that a fork of a robot encounters a collision;

determining a fork collision processing strategy according to the collision type; and processing the fork collision according to the fork collision processing strategy;

wherein the fork comprises a telescopic arm, the telescopic arm is configured to stretch horizontally, the collision type comprises a collision with a telescopic arm stretched and a collision with the telescopic arm not stretched.

16. The robot according to claim 15, wherein when the collision type is the collision with the telescopic arm not stretched, the computer program comprises following executable computer instructions:

determining a first collision processing strategy according to the collision type; or determining a second collision processing strategy according to the collision type, wherein the first collision processing strategy comprises: controlling a movement speed of the fork to be zero; and the second collision processing strategy comprises: controlling a movement speed of the fork to be zero, and controlling a first driving element to drive the fork to rotate to stop driving the fork to rotate, so that the fork is in a free rotating state.

17. The robot according to claim 15, wherein when the collision type is the collision with the telescopic arm stretched, the computer program comprises following executable computer instructions:

determining a third collision processing strategy according to the collision type; or determining a fourth collision processing strategy according to the collision type; or determining a fifth collision processing strategy according to the collision type; or determining a sixth collision processing strategy according to the collision type, wherein the third collision processing strategy comprises: controlling a stretch/retraction speed of the telescopic arm to be zero;

the fourth collision processing strategy comprises: controlling a stretch/retraction speed of the telescopic arm to be zero, and controlling a first driving element to drive the fork to rotate to stop driving the fork to rotate, so that the fork is in a free rotating state;

the fifth collision processing strategy comprises: controlling a stretch/retraction speed of the telescopic arm to be zero, and controlling a second driving element to drive the telescopic arm to stretch/retract to stop driving the telescopic arm to stretch/retract, so that the telescopic arm is in a free stretching/retracting state; and the sixth collision processing strategy comprises: controlling a stretch/retraction speed of the telescopic arm to be zero, and controlling a first driving element to drive the fork to rotate to stop driving the fork to rotate, so that the fork is in a free rotating state; and controlling a second driving element to drive the telescopic arm to stretch/retract to stop driving the telescopic arm to stretch/retract, so that the telescopic arm is in a free stretching/retracting state.

18. A non-transitory computer-readable storage medium comprising instructions, wherein the instructions, when executed by a processor, cause the processor to perform:

determining a collision type when it is detected that a fork of a robot encounters a collision;

determining a fork collision processing strategy according to the collision type; and processing the fork collision according to the fork collision processing strategy;

wherein the fork comprises a telescopic arm, the telescopic arm is configured to stretch horizontally, the collision type comprises a collision with a telescopic arm stretched and a collision with the telescopic arm not stretched.

* * * * *